Figure 1:
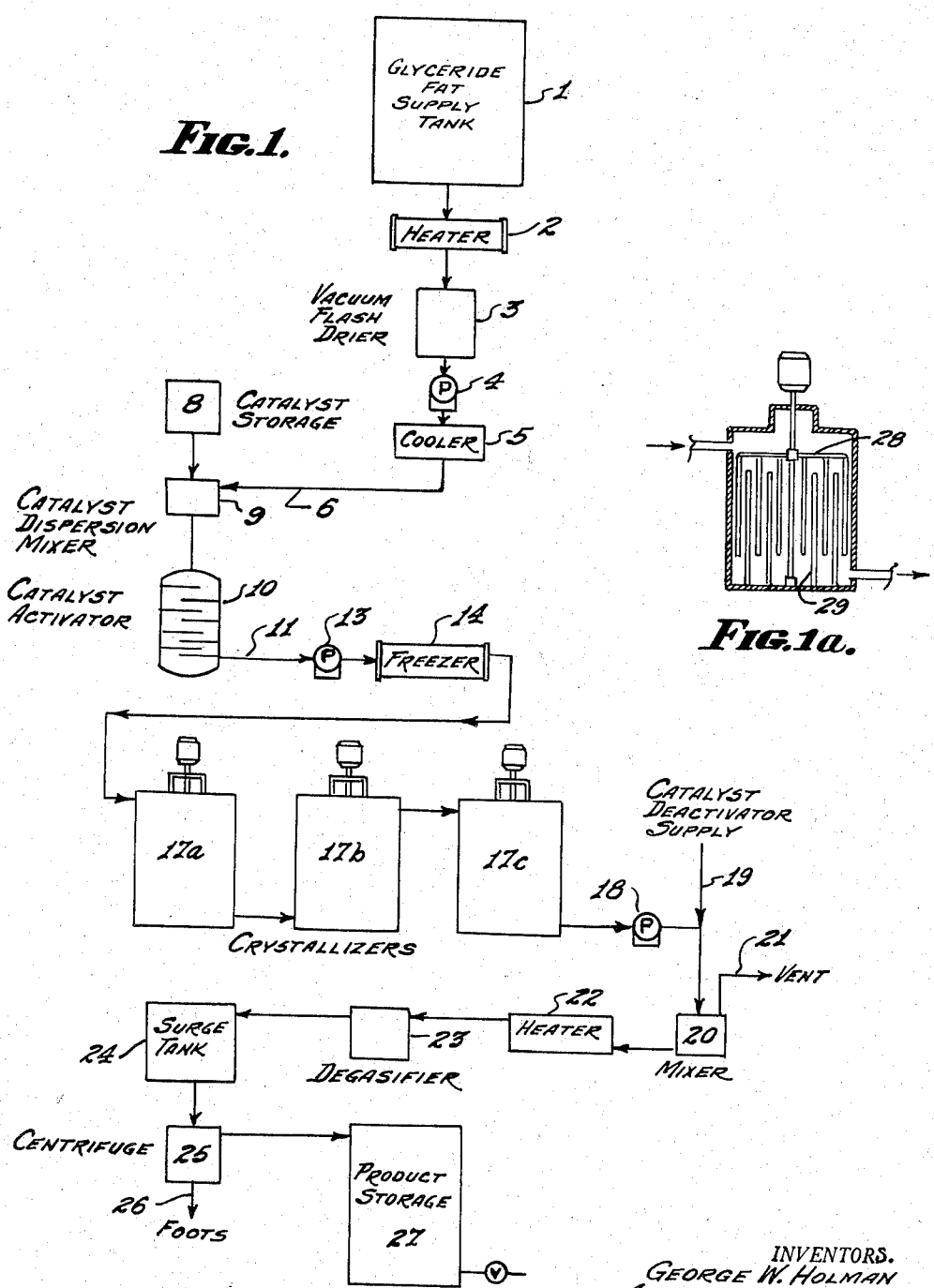

Feb. 24, 1959 — G. W. HOLMAN ET AL — 2,875,067
LARD SHORTENINGS
Filed July 15, 1954 — 3 Sheets-Sheet 1

INVENTORS.
GEORGE W. HOLMAN
AND LOUIS H. GOING,
BY Allen & Allen
ATTORNEYS.

Feb. 24, 1959 G. W. HOLMAN ET AL 2,875,067
LARD SHORTENINGS
Filed July 15, 1954
3 Sheets-Sheet 2

INVENTORS.
GEORGE W. HOLMAN
AND LOUIS H. GOING,
BY
Allen & Allen
ATTORNEYS.

United States Patent Office 2,875,067
Patented Feb. 24, 1959

2,875,067

LARD SHORTENINGS

George W. Holman, Wyoming, and Louis H. Going, Loveland, Ohio, assignors to The Procter & Gamble Company, Cincinnati, Ohio, a corporation of Ohio Application July 15, 1954, Serial No. 443,656

7 Claims. (Cl. 99—122)

This invention relates to improved plastic shortenings made from lard by a process which includes directed interesterification of the lard triglycerides followed by hydrogenation.

Lard, which is one of the oldest and most widely used of plastic shortenings, has during recent times been improved in quality and performance characteristics. Partial hydrogenation, and/or the incorporation of antioxidants, has given it greater resistance against developing off flavors and odors. Steam vacuum deodorization has improved its flavor. The incorporation of "hard stock" (i. e. triglycerides that have been substantially completely hydrogenated) has improved its plasticity. Interesterification while wholly in the liquid phase, commonly referred to as "random rearrangement," has largely eliminated the natural tendency of lard to become objectionably grainy in appearance and feel (see A. E. Bailey's "Industrial Oil and Fat Products," 1945, pp. 213–215, 229–230, 681–682).

Despite these improvements even the best processed lard shortenings hitherto known to us have important shortcomings, having, when hydrogenated sufficiently for reasonably good flavor aging properties, an undesirably narrow "plastic range," i. e. the temperature range within which the shortening retains a desirable measure of plasticity before it becomes either too soft, or "soupy," as the temperature is raised or too firm as the temperature is lowered. The best present-day processed lards have a desirably wide plastic range (brought about by the incorporation of hard stock) only when insufficiently hydrogenated for good flavor stability, this latter defect being evidenced either by the development of undesirable flavors when stored for long periods of time under normal warehouse and market conditions, or by the rapid development of off-flavors and odors when used for deep fat frying.

By "plastic range" we mean the magnitude of the temperature range, in degrees Fahrenheit, throughout which the penetration of the plasticized shortening product is not below 165 units nor above 217 units by A. S. T. M. method D217–52T.

Principal objects of the present invention are to produce processed animal fat shortenings, made (as more specifically defined in what follows) either entirely or principally from lard, which are markedly superior to prior animal fat shortenings in the combination of plastic range versus flavor stability.

Other objects are to provide plastic shortenings made from blends of lard and edible tallow which are fully equal in quality to the best of prior lard shortenings and yet are more economical; and shortenings made from blends of lard and other glyceride fats which combine the advantages imparted by directedly rearranged lard with desired properties imparted by other glyceride components.

Figure 2:
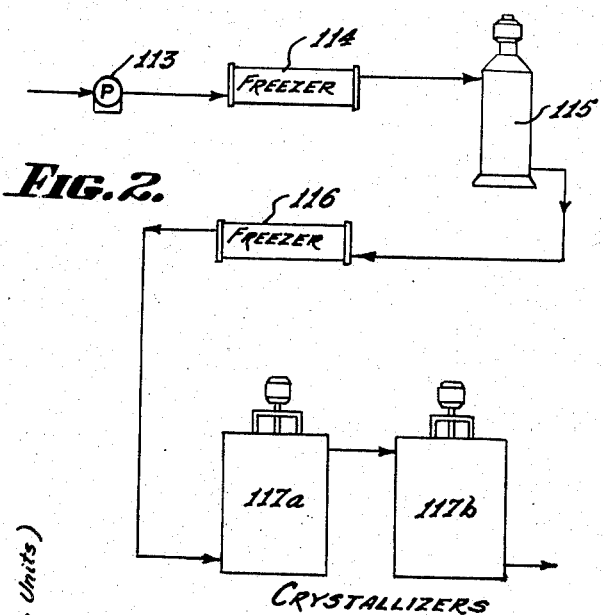
Figure 2A:
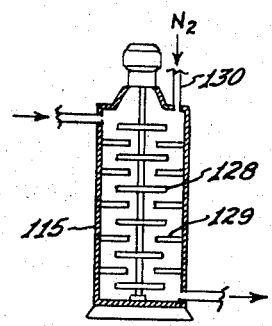
Figure 3:
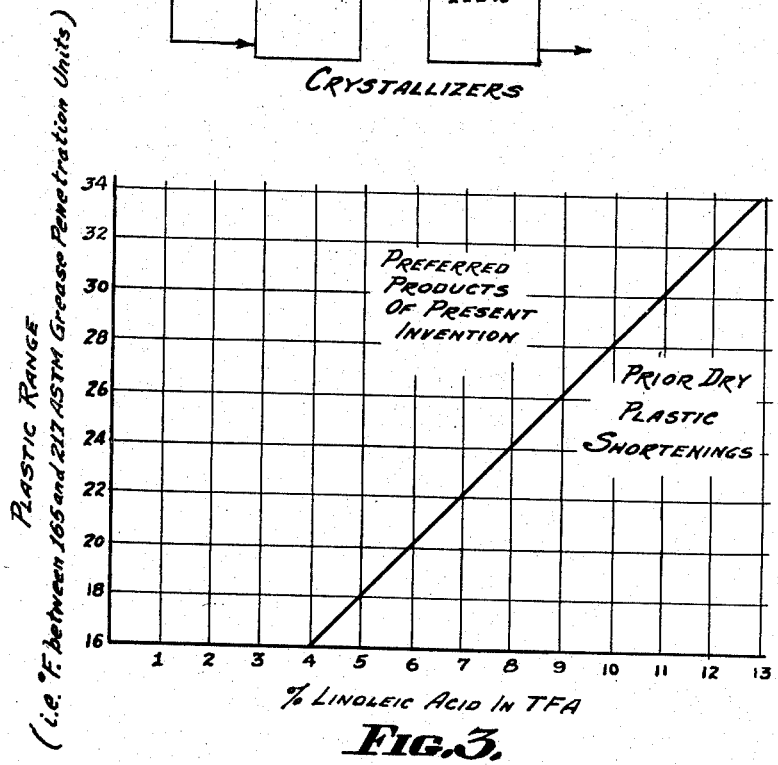
Figure 4:
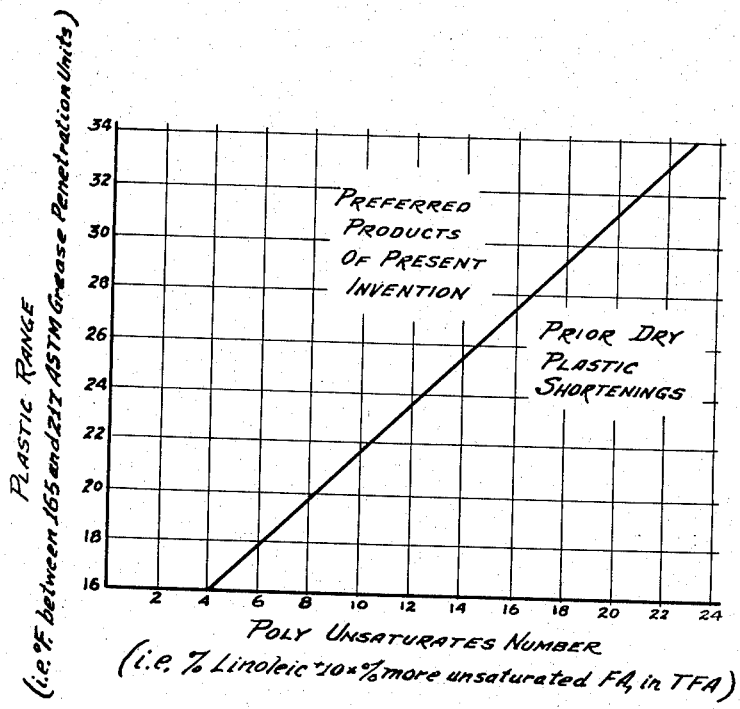

In the accompanying drawings, Figures 1 and 2 are schematic flow charts of different modifications of a process suitable for carrying out the directed rearrangement step in making our products, Figures 1a and 2a being schematic vertical sectional views of designated crystallizers, and Figures 3 and 4 represent correlations between certain characteristics of plastic shortenings.

We have found that if lard is subjected to low temperature directed rearrangement, as more fully described hereinafter (see also U. S. Patents 2,442,531, -532), and if this rearrangement is stopped after from about one fourth to about one half of the saturated combined fatty acids of the lard have become combined as trisaturated triglycerides (hereafter frequently referred to as trisaturates) there results a fatty mixture which when plasticized has a desirable plastic consistency at normal room temperature and has an exceptionally wide plastic range, comparable to that of well known vegetable "compound" shortening (oil plus hardstock), an earlier day product of excellent plasticity but poor flavor stability. Such directedly rearranged lard shortening, however, does not have good flavor stability unless it is partially hydrogenated.

We have discovered that by stopping the directed rearrangement short of the point required to give preferred plastic consistency at normal room temperatures, and then hydrogenating to a greater degree of saturation than is customary in making known hydrogenated lard shortening which contains added hard stock, one obtains a plastic shortening of the desired room temperature consistency while still retaining a wide plastic range as compared either with natural lard, with hydrogenated lard, or with randomly rearranged lard, all of which have been adjusted to good room temperature consistency by the incorporation of hard stock. This greater extent of hydrogenation in making our products reduces the content of highly unsaturated constituents which are susceptible to oxidative deterioration and provides a lard shortening combining superior flavor stability and resistance to heat with an exceptionally broad plastic range.

We have further discovered that by stopping the directed rearrangement even earlier, and hydrogenating to an even greater degree of saturation, one can produce a shortening of normal room temperature plastic consistency, normal plastic range (as compared with most widely used present-day animal fat shortenings and hydrogenated vegetable shortenings), and greatly superior flavor stability and resistance to heat.

In brief, we have found that for any chosen degree of hydrogenation (and corresponding resistance to deterioration in flavor or odor) the shortening products of our invention have wider plastic ranges than any commercial lard shortening that has come to our attention, or than any shortening made by prior processes from the same blend of glycerides as ours. If the resistance to deterioration in flavor or odor is expressed in terms of content of highly unsaturated fatty acid radicals (two or more double bonds in the carbon chain) then the same statement as to our lard shortening products holds true in comparsion with any commercial shortenings known to us, whether of animal or vegetable origin. Figures 3 and 4, which are explained later, show the dividing lines between the preferred products of the present invention (not including some which contain substantial amounts of glycerides which are not derived from lard) and prior shortenings.

Variations in lard shortening products are obtainable, not only by varying the degrees of directed rearrangement and of subsequent hydrogenation, but also by blending a preponderance of lard with a lesser proportion of one or more glyceridic fats such as edible tallow, palm oil, vegetable seed oils common to the temperate zone (e. g. partially hydrogenated cottonseed oil, soybean oil, corn oil, sunflower seed oil, linseed oil, peanut oil, etc.), randomly rearranged lard, fully hydrogenated triglycerides (hard stock, derived usually from lard, cottonseed oil, or soybean oil), mono- and diglycerides, and the like. In some cases it will be found advantageous to add such lesser components before directed interesterification, and in other cases during or after interesterification.

In brief, our invention comprises glyceride blends for use in the making of plastic shortenings by known procedures (and the resulting shortenings), said blends being derived principally from lard wherein the natural lard triglycerides have been reshuffled or rearranged in such a manner (as by partial directed rearrangement) that the trisaturates content has been increased and the disaturates-monounsaturates content has been decreased, and wherein the linoleic and more highly unsaturated fatty acid radical content has been decreased (as by partial hydrogenation), the said blends when plasticized having a combination of plastic range and flavor stability superior to that imparted to otherwise similar blends of initial glycerides by previously known processes. The blends produced as herein taught may be mixed in all proportions with conventional hydrogenated vegetable shortenings which, in themselves, exhibit when plasticized acceptable plastic ranges, and in this way mixed animal-vegetable shortenings of superior qualities may be produced. In the making of such mixed shortenings it will be usual to admix blends produced as herein taught and hydrogenated vegetable shortening stocks, afterwards plasticizing the mixture. Such mixed shortenings are within the scope of our invention.

A rapid and economical method of directedly rearranging lard, in making products of the present invention, comprises passing a continuous stream of dried melted lard through a rapid chilling operation in admixture with a low temperature interesterification catalyst, the temperature being lowered sufficiently to cause trisaturated glycerides to crystallize out of solution, and the manner of chilling, desirably with intense agitation, being such that a cloud of extremely minute crystals forms. Thereupon we continue to move the stream along, preferably at greatly reduced velocity, while effecting progressive interesterification of the triglycerides in the liquid phase and simultaneous crystallization of newly formed trisaturates, at progressively rising temperatures. During this stage of the process the stream is agitated to prevent solidification of the thixotropic mass as its crystalline solids content increases and to facilitate continued crystallization of newly formed trisaturates. Precautions preferably are taken to minimize end-for-end mixing, i. e. contamination of intermediate or later portions of the progressively changing mass with less changed material from earlier portions. Finally, when the total trisaturate content of the most advanced portion of the stream has reached a predetermined desired value (which in all cases is short of the equilibrium trisaturate content attainable by prolonging the process either at the then prevailing temperature or under adiabatic conditions) the catalyst is inactivated, the mass is heated until fully melted, and the soap foots and other extraneous materials resulting from the catalyst deactivation are removed. Subsequently other processing steps normal and desirable in the manufacture of plastic shortening are carried out, as well as the step of partial hydrogenation. These other steps may include refining, bleaching, blending, deodorizing, plasticizing, tempering, and packing.

We find it desirable, in some circumstances, to employ two or more cycles of the above described sequence of quick continuous cooling followed by slow continuous directed rearrangement. In that event the first chilling is not as extreme as it is when but one cycle is to be employed, and similarly the first directed rearrangement stage is shorter, this step being interrupted part way by the second stage of rapid chilling (see Figure 2). In the preferred practice the total time of rapid chilling, whether carried out in one or more stages, need take no more than a minute or less, and the total desired amount of directed rearrangement with slowly rising temperature can be and normally is accomplished in about one to two hours.

A quick means of obtaining a rough measure of the extent of directed rearrangement is the "cloud point" test. When lard is randomly rearranged (i. e. interesterified while wholly in liquid condition) its cloud point usually rises about 2° to 5° C., and when either the crude lard or the randomly rearranged lard is subjected to directed rearrangement its cloud point increases progressively. An increase of at least 3° or 4° C. over the cloud point of the randomly rearranged material, and an overall increase of about 6° to about 16° C. over the cloud point of the crude lard is desirable in making our plastic lard shortenings. Briefly, we determine the cloud point of a melted sample by placing it in a tall form electrolytic type beaker (Corning #1140) equipped with a stirring device and a centigrade thermometer, flowing a stream of water at 0° to 7° C. over the outside of the beaker at such a rate that the temperature of the glyceride mixture drops from 60° to 40° C. in about one minute, passing a beam of white light through the beaker and sample, the transmitted beam intensity being such that a photocell registers 200 microamperes while the sample is wholly liquid, and noting the temperature at which the transmitted beam intensity is reduced to 31.4% of its initial intensity as a result of crystal formation throughout the sample.

A more accurate measure of the extent of directed rearrangement, although not as quick as the cloud point test, is the determination at some one temperature, or better at several temperatures, of the solids content index (S. C. I.) as described in 31 J. A. O. C. S. 98–103 (March 1954). This test gives an accurately reproducible approximation of the percentage by weight of solids in a sample of the product at the selected temperature, as determined dilatometrically on the reasonable assumption that the fat solids are just 10% more dense than the liquid oil.

The first two of the following examples describe in detail advantageous continuous methods of carrying out the directed rearrangement step in making our products. These two and the other specific examples which follow describe typical products of the invention, and tell how they may be made.

*Example 1.*—Referring to Figure 1, melted prime steam lard containing 0.13% of moisture, is fed at a rate of 100 parts by weight per hour from storage tank 1, through heater 2 where its temperature is raised to about 330° F., into vacuum flash drier 3 (a chamber maintained under reduced pressure, into which the heated oil is admitted in attenuated form, e. g., as a spray, so as to provide a large surface area for the escape of vaporized water) in which its moisture content is reduced below 0.01%. The dried lard is then transferred by pump 4 to tubular cooler 5 (e. g. a conventional tubular heat exchanger) which reduces its temperature to about 100° F.; thence it passes through pipe 6 to the catalyst dispersion mixer 9. A dispersion of metallic sodium in an equal weight of toluene is fed from catalyst storage tank 8 at a rate of 0.34 part per hour into mixer 9, this being equipped with a high speed mechanical agitator capable of creating a uniform dispersion of the sodium particles, of about 5 to 20 micron size, throughout the whole body of melted, or nearly melted, dry lard.

The lard-sodium dispersion is retained for several minutes in tank 10 to allow time for activation of the catalyst. This catalyst activation is not well understood, and it is assumed that the metallic sodium is not the true catalyst, but that it reacts with fatty matter to form a reaction product which is the true interesterification catalyst. For a brief induction period after the sodium-toluene dispersion is mixed with the liquid lard the cloud point of the lard remains unchanged, but within a very few minutes it begins to change rather rapidly, indicating that active catalyst has formed and interesterification has begun. This test may be made upon samples of the lard withdrawn from different parts of tank 10 and instantly subjected to catalyst deactivation and removal, the cloud point of the purified sample then being determined by the method previously described.

The lard-catalyst dispersion is then drawn through pipe line 11 by pump 13 and passed through the scraped-wall freezer 14 which reduces its temperature to 70° F. so rapidly that there is an initial supercooling that is quickly followed by the formation of a heavy cloud of minute solid fat crystals throughout the flowing mass.

The chilled triglyceride mixture then passes slowly through one or more of the series of crystallizers represented at 17a, 17b, 17c, etc. Each of these is equipped with a mechanical agitator, which may be in the form of a slowly revolving rake 28, mounted on a vertical shaft as shown in Fig. 1a, stationary vertical hold-back blades 29 being mounted on the floor of the tank so as to be positioned between the moving rake teeth. (Alternatively, one or more crystallizers of the type shown in Fig. 2a may be used.) Each crystallizer can conveniently be provided with heating means, mainly for emergency use in case its contents become too stiff to pump.

While in the crystallizers interesterification occurs throughout the liquid fraction of the glyercide mixture, and as this tends to produce a random distribution of the different species of fatty acid radicals upon the glycerin radicals of this liquid fraction it results in the creation of new trisaturates to replace those which have precipitated out of solution as solid fat crystals. The temperature of the mass is, however, too low to permit all of these newly formed trisaturates to remain in solution in the liquid fraction, and they therefore crystallize, thus prolonging the deficiency of trisaturates dissolved in the random-tending liquid fraction. The temperature of the slowly moving body of glycerides gradually increases, due to the heat of crystallization which is liberated (and due also to some mechanically generated heat from the agitation), and as the ratio of its solid fraction to its liquid fraction increases it acquires a thixotropic character, requiring constant agitation to prevent solidification.

In this particular example, we adjust the dwell time of the triglyceride mixture in the crystallizer (or in the battery of crystallizers if several are used) to be just 60 minutes, this being accomplished by suitable adjustment of the level of the mass in the last of the series of crystallizer units, as controlled by the delivery rate of pump 18. The temperature of the processed lard leaving the crystallizer at the end of its 60 minutes of directed rearrangement is 92° F.

On the way to mixer 20 there is added to the stream of semi-solid glycerides from the last crystallizer 2.07 parts per hour of water, from pipe line 19, this being the amount of water found suitable to hydrolyze or decompose the sodium-containing active catalyst, react with any residual sodium, form a caustic lye capable of refining the processed lard, and form soap foots capable of easy removal by centrifuging.

The aqueous catalyst deactivating agent (in this case water) is thoroughly mixed throughout the directedly interesterified lard in mixer 20 while the temperature rises to 103° F.; the mixture is then quickly passed through the heater 22, which melts the solid trisaturate fraction; and then through degasifier 23 into the temporary storage tank, or surge tank 24. Hydrogen is generated in small amount as a result of reaction of the sodium, and it is removed in part through vent 21, and in part by means of degasifier 23 which is maintained under reduced pressure.

From surge tank 24, which may be equipped with an agitator to facilitate the coagulation of soap foots, the refined processed lard is passed through centrifuge 25 (from which foots are removed at 26) and thence to storage tank 27. (Surge tank 24 may be by-passed if desired.) After this the processed lard may be slightly hydrogenated, deodorized, plasticized, and packed.

The directed rearrangement in this case raises the cloud point of the lard from an initial value of 22.9° C. to a final value of 31.8° C. This corresponds to a plasticized lard having good consistency for household use, and this particular directedly rearranged lard will ordinarily be partially hydrogenated only when it is to be used in making a relatively firm commercial shortening.

*Example 2.*—Referring now to Figure 2, which illustrates those portions of a two-cycle directed rearrangement process which differ from Figure 1, a melted blend of 90% prime steam lard and 10% edible beef tallow is dried and cooled to 113° F., and to a flowing stream of this glyceride mixture there is continuously added 0.24% of a liquid 50–50 mixture of sodium and potassium, which is finely dispersed throughout the body of melted fat. After allowing ample time for catalyst activation the fat-catalyst dispersion is fed by pump 113 continuously through the first freezer 114, from which it issues at a temperature of 82° F.

Crystallization and continuing interesterification then continue while the mixture passes through the preliminary crystallizer 115. This requires about two minutes, during which time the temperature rises to 87° F. This crystallizer, which may be constructed as shown schematically in Figure 2a, is equipped with agitator blades 128, turning at about 120 R. P. M., hold-back arms 129, and a nitrogen inlet 130. (The use of an inert gas blanket is recommended in all vessels containing alkali metals which are not kept filled with the liquid fat.)

From preliminary crystallizer 115 the thixotropic mass flows to the second freezer 116 which cools it to 80° F. Thence it passes through crystallizers 117a and 117b, and after a total dwell time of 75 minutes in these two vessels it emerges at a temperature of 90° F. Before further rise in temperature occurs the catalyst in it is inactivated, the fat is melted, and the foots are removed, all as described in Example 1.

This processing raises the cloud point from 23.2° C., for the initial blend, to 31.7° C. after catalyst removal.

The directedly rearranged lard blend is then hydrogenated to the extent of a 1.9 decrease in its iodine value. After steam-vacuum deodorization it is plasticized by rapidly chilling to induce copious crystal formation, picking (i. e. agitating to inhibit crystal interlocking) until the temperature rises to about 78° to 80° F., and packing.

The first column in Table I shows the penetration values (converted to A. S. T. M. grease penetrometer equivalents) at different temperatures, and the plastic range of samples of the product of this Example 2 which are first tempered for two days at 80° F. The lower part of this first column shows the content of highly unsaturated fatty acid radicals in this product, these being a measure of its lack of flavor stability. The polyunsaturates number (by which we mean the percent linoleic + 10 times the percent of more highly unsaturated fatty acid radicals) of this product is, for a shortening having a plastic range of 23, higher than that of our preferred lard shortenings, but this is a product that is fully on a par with highly successful prior lard shortenings and under most produce market conditions it is a more economical product.

TABLE I

*ASTM grease penetration value [1] vs. temperature*

|  | Example 2 | Example 3 | Example 4 |
|---|---|---|---|
| 50° F | 91 | 117 | 119 |
| 60° F | 134 | 151 | 151 |
| 70° F | 164 | 174 | 174 |
| 80° F | 187 | 191 | 191 |
| 90° F | 207 | 214 | 214 |
| 100° F | 242 |  | 247 |
| Plastic range (°F. between 165 and 217 penetration values) | 23 | 25 | 25 |
| Percent linoleic [2] | 7.9 | 6.9 | 8.2 |
| Percent more highly unsat. F. A.[2] | 0.74 | 0.50 | 0.62 |
| Polyunsaturates number [3] | 15.3 | 11.9 | 14.4 |

[1] American Society for Testing Materials method D217-52T.
[2] As determined by ultraviolet spectroscopy.
[3] I.e. percent linoleic and equivalent plus ten times the percent of fatty acid radicals more highly unsaturated than linoleic. This number is a useful guide to flavor stability, although the choice of the factor 10 is arbitrary.

*Example 3.*—In a procedure generally similar to Example 1, except (a) that 0.4% of sodium methylate is used as a catalyst instead of metallic sodium, and (b) that the lard-catalyst mixture is randomly rearranged at 140–160° F. before entering the freezer 14, the lard is rapidly chilled to 74° F., directed rearrangement is continued for one hour while the temperature rises to 83° F., the catalyst is inactivated by the incorporation of 1.7% of water, the fat is melted, and the soap foots are removed. This treatment increases the cloud point of the lard from 20.0° to 32.2° C.

This directedly rearranged lard is hydrogenated at 330° F., at a hydrogen pressure only slightly above atmospheric, to an iodine value drop of 9.1 units. The Solids Content Index of the resulting product at 70° F. is 22.5, which is too high for optimum consistency for a household shortening. This is corrected by adding 15% by weight of lard which has been randomly rearranged and hydrogenated to an I. V. drop of about 3 to 4 units, and also adding (towards the end of deodorization) 4.5% by weight of a mixture of mono-, di-, and triglycerides (the proportions of these being about 40:40:20) of partially hydrogenated (about 78 I. V.) cottonseed oil.

Penetration values and plastic range of the plasticized and tempered product are shown in Table I, together with its content of highly unsaturated fatty acid radicals. This product has an excellent plastic range and a low polysaturates number, and is representative of our preferred products.

*Example 4.*—Melted prime steam lard is heated to 330° F. in a continuous manner at a rate of 100 parts by weight per hour, the flowing stream is dried in a two-stage vacuum drier to below 0.01% moisture content, cooled to 110° F., 0.24 part by weight per hour of Na—K catalyst are introduced and dispersed throughout the stream, 15 minutes time is allowed for catalyst activation and initial undirected interesterification, hydrogen gas is removed, the lard-catalyst dispersion is chilled to 70° F. in a continuous freezer, the chilled slurry is retained under mild agitation (in this case 40 R. P. M.) during a 90 minutes dwell time in a continuous crystallizer from which it emerges at 87.5° F., 2.3 parts by weight per hour of water is introduced with agitation into the stream leaving the crystallizer, the mixture is heated to 160° F., the refining foots which float to the top (due to entrained gas) are removed, the refined glycerides are filtered, and are then hydrogenated from an initial I. V. of 72 to a final I. V. of 66, 4.5% of a mono- and di- and triglyceride mixture (about 40:40:20 parts respectively) is then incorporated, and the glyceride mixture is deodorized, plasticized, packed, and tempered.

The cloud point of the crude lard was about 17° C. and that of the directedly rearranged material, before hydrogenation, is about 31° C. The plasticized finished product has a wide plastic range (165 ASTM penetration units at 66° F. and 217 units at 91° F.) and has excellent behavior characteristics when used as a shortening. Its plasticity data and highly unsaturated fatty acid values are set forth in Table I.

*Examples 5, 6, 7.*—Table I-a contains data on the characteristics of three more products of our invention, all made by partial directed rearranging and hydrogenation of lard. The plasticized products contain 4.5% of a mono-, di-, and tri-glyceride mixture.

TABLE I-a

|  | Example 5 | Example 6 | Example 7 |
|---|---|---|---|
| Cloud points, °C.: |  |  |  |
| Initial | 19.9 | 18.6 | 19.5 |
| After directed rearrangement | 30.2 | 31.8 | 31.7 |
| I. V. drop in hydrogenation | 5.6 | 2.0 | 5.0 |
| Percent linoleic after hydrogenation | 6.0 | 8.9 | 7.4 |
| Percent more highly unsaturated after hydrogenation | 0.33 | 0.69 | 0.43 |
| S. C. I. at 70° F.: |  |  |  |
| After directed rearrangement | 18.4 | 21.6 | 20.9 |
| After post-hydrogenation | 21.0 | 22.7 | 23.6 |
| S. C. I. at 92° F.: |  |  |  |
| After directed rearrangement | 14.5 | 17.9 | 17.4 |
| After post-hydrogenation | 16.5 | 18.8 | 18.9 |
| Plasticized product penetrations: |  |  |  |
| At 50° F | 107 | 110 | 98 |
| At 70° F | 179 | 170 | 165 |
| At 90° F | 223 | 203 | 202 |
| At 100° F |  | 235 | 242 |
| Plastic range (°F. between 165 and 217 penetration values) | 23.7 | 27 | 23 |

*Example 8.*—80 parts of steam rendered lard, directedly rearranged for one hour and to a cloud point of 29.8° C. in the presence of 0.4% of sodium methylate catalyst at an initial crystallizer temperature of 75° F. and a final temperature of 86° F., is hydrogenated from 67.9 I. V. to 63.0 I. V. and mixed with 20 parts of commercial shortening stock having an iodine value of about 70–75 and made from vegetable hard stock and a partially hydrogenated blend of soybean and cottonseed oils. The resulting mixture is deodorized and plasticized. This shortening has a plastic range of 23° F. (63°–86° F.) and good flavor stability.

Typical lard-containing shortenings of our invention have been thoroughly evaluated as to their performance in the baking of cakes, in frying, and in other common culinary uses. In these respects they are found to compare favorably with the best of commercial shortenings, and to have the important advantages of their broad plastic range coupled with good flavor stability.

In directedly rearranging lard, the initial chilling is preferably carried to about 70° to 75° F., but we have conducted the process with initial chilling as low as 60° F. (with single cycle operation) and as high as 84° F. (with two-cycle operation), the operative limits being broader than these values and varying somewhat with the composition and characteristics of the particular lard or lard blend being treated. When lard is quickly chilled to temperatures within these ranges some disaturated monounsaturated glycerides frequently crystallize along with trisaturates. This is particularly noticeable when there has been no pre-randomizing of the lard. These disaturated crystals do not, however, interfer with the process, and they melt or redissolve during the temperature rise which subsequently takes place. Their melting tends to moderate the extent to which the temperature would otherwise rise. The final interesterification temperature in making our products usually ranges from about 80° F. to about 95° F.

The most accurate convenient measure of the extent to which the directed rearrangement reaction (really a series of reversible reactions, accompanied by precipitation of one specie of reaction product) has progressed is the solids content index, or S. C. I., which for any given temperature at which a fat sample is tested tells approximately the percent by weight of solid phase that is present. This as is well known is a vital factor in the plastic behavior of shortenings. This test, which has been referred to just before the specific examples, requires an hour or two to perform and hence is not suitable for quick control purposes.

For actual process control we prefer to employ the previously described "cloud point" test, and when processing a given type of fat, such as prime steam lard, day after day, we find it helpful to prepare a correlation chart for converting cloud points to corresponding S. C. I.'s. In preparing batches of intermediate product (directedly rearranged) ready for hydrogenating, or for deodorizing, plasticizing, packing, one may resort to blending in order to achieve the exact S. C. I. that is desired.

The selection of a suitable end point for the directed rearrangement depends upon the particular triglyceride mixture being processed, the succeeding steps to be taken and the plastic behavior desired in the final product. For lard shortening we have found that an A. S. T. M. penetration value of 180 at 70° F. (a good general purpose consistency) corresponds to an S. C. I. value at 70° F. of about 20 to 22.

The novel products of our invention, to which the appended claims are directed, are glyceride mixtures made principally from lard (and preferably at least about 80% from lard) which has been directly rearranged and hydrogenated either by itself or after blending with lesser proportions of other glycerides, and plastic shortenings made therefrom, so controlled in their composition that these shortenings are superior in their plastic range versus flavor aging properties (when expressed in terms of highly unsaturated fatty acid radical content). It may be helpful to compare our lard shortenings with the "next best" hydrogenated lard shortening that we know of, namely, randomly rearranged and slightly hydrogenated lard to which a minor proportion of hard stock has been added to give it acceptable 70° F. consistency.

An understanding of the general nature of our preferred products may be gained from a study of the data presented in Tables II and III. Typical crude lard is characterized as to its 70° F. S. C. I., its cloud point, and its content of trisaturates ($S_3$), disaturates ($S_2U$), monosaturates ($SU_2$), and triunsaturates ($U_3$), in the first column of Table II. The second column indicates typical changes in these values which result from randomizing the crude lard (i. e. subjecting it to molecular interesterification while wholly in liquid condition); this lowers its S. C. I. at 70° F. due to the creation of a lower melting eutectic of the $S_3$ and $S_2U$ components rather than to a lowering of the total amounts either of $S_3$ or of $S_2U$. The third and fourth columns show what directed rearrangement does in typical instances; it significantly increases the 70° F. S. C. I. and the cloud point, due to a building up of the $S_3$ content at the expense of the $S_2U$ and $SU_2$ components. These changes render it unnecessary to add hard stock for the sake of attaining good consistency over the range of usual room temperatures. By ending the directed interesterification at about the extent typified by column 4, instead of carrying it as far as that typified by column 3, there is "room" (in its 70° F. S. C. I.) to hydrogenate it to about 5 to 10 drop in iodine value to attain good 70° F. consistency without unduly impairing its plastic range. We thus attain flavor keeping qualities superior to those of crude or randomized lards which have been hydrogenated as much as they have "room" for, which is only about 2 to 4 I. V. drop, depending on their initial hardness, and to which hard stock has been added for improved plastic range.

TABLE II

|  | Crude lard | Randomized lard | Directedly rearranged lard | |
|---|---|---|---|---|
|  |  |  | When not to be hydrogenated | When to be post hydrogenated to 5 to 8 I. V. drop |
|  | (1) | (2) | (3) | (4) |
| Range of S. C. I.'s at 70° F. | 17-24 | 8-12 | 20-23 | 17-20 |
| Range of cloud points, °C. | 17-24 | 21-26 | 31-33 | 30-32 |
| Typical percent $S_3$ | 2.5 | 5 | 13.0 | 10 |
| Typical percent $S_2U$ | 27 | 25 | 16.5 | 20 |
| Typical percent $SU_2$ | 49.5 | 44 | 39.0 | 41 |
| Typical percent $U_3$ | 21 | 26 | 31.5 | 29 |

TABLE III

|  | (a) Randomly rearranged and hydrogenated lard containing added hard stock | (b) Directedly rearranged and hydrogenated lard |
|---|---|---|
| I. V. drop in hydrogenation | 2 to 3 | 5 to 6 |
| ASTM Penetration at 70° F. | 180 | 180 |
| ASTM Penetration at 50° F. | 94 | 122 |
| Temperature at 217 penetration, °F. | 82 | 90 |
| Temperature at 165 penetration, °F. | 65 | 62 |
| Plastic range, °F. | 17 | 28 |
| Percent Linoleic | 9 | 6 |

This advantage may be understood if one compares the composition of the directedly rearranged lard of column (4) of Table II with that of a blend of the randomized lard of column (2) and enough added hard stock to bring both compositions to the same percent $S_3$, thus:

|  | Percent $S_3$ (Solid) | Percent $S_2U$ (Intermediate melting) | Percent $SU_2$ (Liquid) | Percent $U_3$ (Liquid) | Total |
|---|---|---|---|---|---|
| (2) Randomized lard | 5 | 25 | 44 | 26 | 100 |
| (2-a) Same plus 5.56% hard stock | 10 | 23.7 | 41.7 | 24.6 | 100 |
| (4) Directedly rearranged lard | 10 | 20 | 41 | 29 | 100 |
| Differences between (2-a) and (4) | 0 | +3.7 | -3.7 |  |  |

It is clear that at intermediate temperatures (2-a) will tend to be decidedly firmer than (4), and that in consequence (4) can be hydrogenated to a greater degree than (2-a) without exceeding the latter in firmness.

Table III contrasts (a) a typical finished plastic shortening made by the prior practice of randomly rearranging lard, hydrogenating it as far as is practical without very greatly impairing its plastic range, and incorporating hard stock to give a desirable consistency, with (b) a typical product of the present invention made from similar lard by directed rearrangement, and hydrogenating to a 5 to 6 unit drop in iodine value. In each case the materials are plasticized in conventional manner. It will be noted that both have the same penetration at 70° F., but that product (b) has a better consistency than (a) at icebox temperature, 50° F., that it will stand an 8° F. higher summer temperature before becoming undesirably soft (i. e. before its penetration exceeds 217), that it will stand a 3° F. lower cool temperature before becoming undesirably firm (i. e. before its penetration falls below 165), and of course that it has significantly better keeping qualities due to its 3 I. V. unit further hydrogenation.

We have examined and tested a great many lard shortenings and a great many vegetable shortenings, made by various practices and combinations of processing steps. We have found that our preferred directedly rearranged, hydrogenated, and plasticized lard shortenings fall above the diagonal lines of Figures 3 and 4, and that all prior shortenings tested, including crude lard shortenings, randomly rearranged lard shortenings, randomly rearranged and hydrogenated lard shortenings, and vegetable shortenings fall either below these diagonal lines or, in extreme cases such as vegetable "compound" shortening and biscuit and crack shortening, either to the right of the entire charts or below them.

Those of our predominantly lard-containing shortenings which do not fall above the diagonal lines of Figures 3 and 4 do fall closer to the upper left hand corners of these figures than do corresponding shortenings containing the same proportion of lard but made by any of the prior processes which involve partial hydrogenation and the incorporation of hard stock (which is not subsequently interesterified with the lard-derived component).

In general, relatively improved flavor stability results when in making our products the hydrogenation is sufficient to reduce the linoleic acid radical content to below 10% and the polyunsaturates number to below 16. When one is willing to sacrifice some degree of flavor stability in order to gain a superlative plastic range, polyunsaturate numbers up to about 18 may be tolerated. On the other hand, when one desires to place the emphasis on flavor stability, a plastic range as low as 21° F. may be tolerated. Our preference is to combine linoleic acid radical contents below about 9 with plastic ranges above about 23 in such a manner that both values lie above the diagonal of Figure 3.

In all cases the plastic shortenings resulting from the practice of our invention, when lard forms at least 80% of the raw materials used, have been found to have a rather characteristic trisaturate composition, constituted of about 40% to about 75% palmitic (as compared with less than 35% palmitic in the trisaturates of shortenings in which fully hydrogenated cottonseed or soybean oil or animal fat is used as the hard stock) and about 60% to about 25% stearic. Although these values are not critical, they serve as one identifying characteristic of our product. When such directedly rearranged lard products are plasticized (rapidly chilled and agitated in accordance with well known practice) the initial phase composition of the solid portion of the shortening has been found to be beta prime-2 phase, and upon aging it may slowly change to beta-2 phase. (See E. S. Lutton, J. A. O. C. S., July 1950, for identifying characteristics of these phases.) Our preferred products have an unusually low content of triglycerides of intermediate melting point, i. e. those which melt when the temperature of the product is warmed from 40° F. to 103° F. As judged by their S. C. I. values, these range from about 14% to about 20% of the product, as compared to about 29% in natural lard, about 24% in randomly rearranged lard, and about 24% in hydrogenated vegetable shortening. It is to this fact that we attribute our products' wide plastic range.

Having thus described our invention, what we claim and desire to secure by Letters Patent is:

1. Plastic shortening at least 90% of which is made from a low temperature directedly rearranged and partially hydrogenated mixture of triglycerides consisting at least 80% of the triglyceries of lard and not over 20% of the triglyceries of edible tallow, the remaining 0% to 10% of the shortening consisting of glyceridic fats adaptable to use as components of plastic shortenings, selected from the group consisting of monoglycerides, diglycerides, and triglycerides of lard, of edible tallow, of randomly rearranged lard, of palm oil, and of partially hydrogenated cottonseed oil, corn oil, soybean oil, sunflower seed oil, linseed oil, and peanut oil, and mixtures of any of these, at least a fourth and not over half of the saturated fatty acid radicals of said directedly rearranged mixture being combined as trisaturated triglycerides prior to its partial hydrogenation, said shortening having a plastic range as herein defined of at least 21° F. and a polyunsaturates number as herein defined no higher than 16, the point representing the plastic range and the polyunsaturates number of said shortening being above the diagonal line of Figure 4.

2. A plastic shortening component consisting essentially of lard triglycerides which have been directedly interesterified and partially hydrogenated, at least a fourth and not over half of the saturated fatty acid radicals of said directedly rearranged mixture being combined as trisaturated triglycerides prior to its partial hydrogenation, the portion of said component which melts over the temperature range from 40° F. to 103° F. being less than 20% by weight of the whole as approximated by S. C. I. determinations at these temperatures, said component having a combined linoleic content below 10%.

3. The shortening component of claim 2 in which the partial hydrogenation effected an iodine value drop of from about 5 to about 10 units.

4. In the manufacture of plastic shortening the process which comprises rapidly chilling successive portions of a continuously flowing agitated stream of a melted mixture of triglycerides consisting at least 80% of the triglycerides of lard and not over 20% of the triglycerides of edible tallow, to cause initial supercooling followed by the formation of a heavy cloud of minute solid fat crystals throughout the flowing mass, the total time of said rapid chilling of any portion of the stream being no more than one minute, thereupon effecting low temperature directed interesterification of said chilled mixture of triglycerides in the presence of a low temperature interesterification catalyst and continuous crystal-facilitating agitation and at progressively rising temperatures, interrupting said interesterification by inactivating the catalyst when from about one fourth to about one half of the saturated fatty acid radicals of the glyceride mixture are combined as trisaturated triglycerides, removing soap foots and other extraneous materials resulting from the catalyst inactivation, and partially hydrogenating the resulting mixture of glycerides to a combined linoleic acid content below 10% but not below 4%.

5. The process of claim 4 wherein the low temperature directed interesterification is initiated within the range from about 84° F. to about 60° F. and is concluded within the range from about 95° to 80°, and includes sufficient rise in temperature to dissolve any disaturated monounsaturated glycerides which may have crystallized during the early part of this step.

6. The process of claim 4 wherein the low temperature directed interesterification is terminated when the S. C. I. at 70° F. of the interesterifying glyceride mixture has reached the range from about 18 to about 22.

7. The process of claim 4 wherein the low temperature directed interesterification is terminated when the S. C. I. at 100° F. of the interesterifying glyceride mixture has reached the range from about 10 to about 18.

References Cited in the file of this patent

UNITED STATES PATENTS

| | | |
|---|---|---|
| 2,442,532 | Eckey | June 1, 1948 |
| 2,442,533 | Eckey | June 1, 1948 |
| 2,571,315 | Vander Wal et al. | Oct. 16, 1951 |
| 2,614,937 | Baur et al. | Oct. 21, 1952 |
| 2,625,483 | Mattil et al. | Jan. 13, 1953 |
| 2,726,158 | Cochran et al. | Dec. 6, 1955 |